United States Patent [19]

Watkins

[11] 4,241,793
[45] Dec. 30, 1980

[54] ROTARY HOE SCRATCHER

[76] Inventor: Murrell G. Watkins, Rte. 3, Box 92, Muleshoe, Tex. 79347

[21] Appl. No.: 5,146

[22] Filed: Jan. 22, 1979

[51] Int. Cl.$^2$ .......................................... A01B 21/04
[52] U.S. Cl. .................................. 172/551; 172/573; 172/705; 172/624
[58] Field of Search ............... 172/624, 540, 572, 551, 172/705, 573, 556, 657, 646

[56] References Cited

U.S. PATENT DOCUMENTS

| 798,875 | 9/1905 | Cone | 172/574 |
|---|---|---|---|
| 1,490,514 | 4/1924 | Knutson | 172/540 |
| 1,639,307 | 8/1927 | Neu | 172/574 |
| 1,770,648 | 7/1930 | Johnson | 172/548 |
| 3,175,522 | 3/1965 | Garber | 172/556 X |
| 3,203,487 | 8/1965 | Whitesides | 172/548 |
| 3,398,707 | 8/1968 | McClenny | 172/540 |
| 3,554,297 | 7/1967 | Lehman | 172/573 |
| 3,734,201 | 5/1973 | Zaun | 172/551 |
| 3,756,372 | 9/1973 | Orthman | 172/763 |
| 3,923,103 | 12/1975 | Davis | 172/72 |
| 4,055,126 | 10/1977 | Brown | 172/540 |

Primary Examiner—Richard J. Johnson
Attorney, Agent, or Firm—Wendell Coffee

[57] ABSTRACT

A set of four rotary hoes are evenly spaced apart laterally so that the distance between the tracks is two inches and the distance between the outside hoes is six inches. The assembly is pivoted about the center to ride over uneven ground. The front and back hoe are removable so that the other two hoes, which are widest apart, may be operated as a rotating shield. The mounting is attached to the tool bar of a tractor and spring biased downward.

3 Claims, 4 Drawing Figures

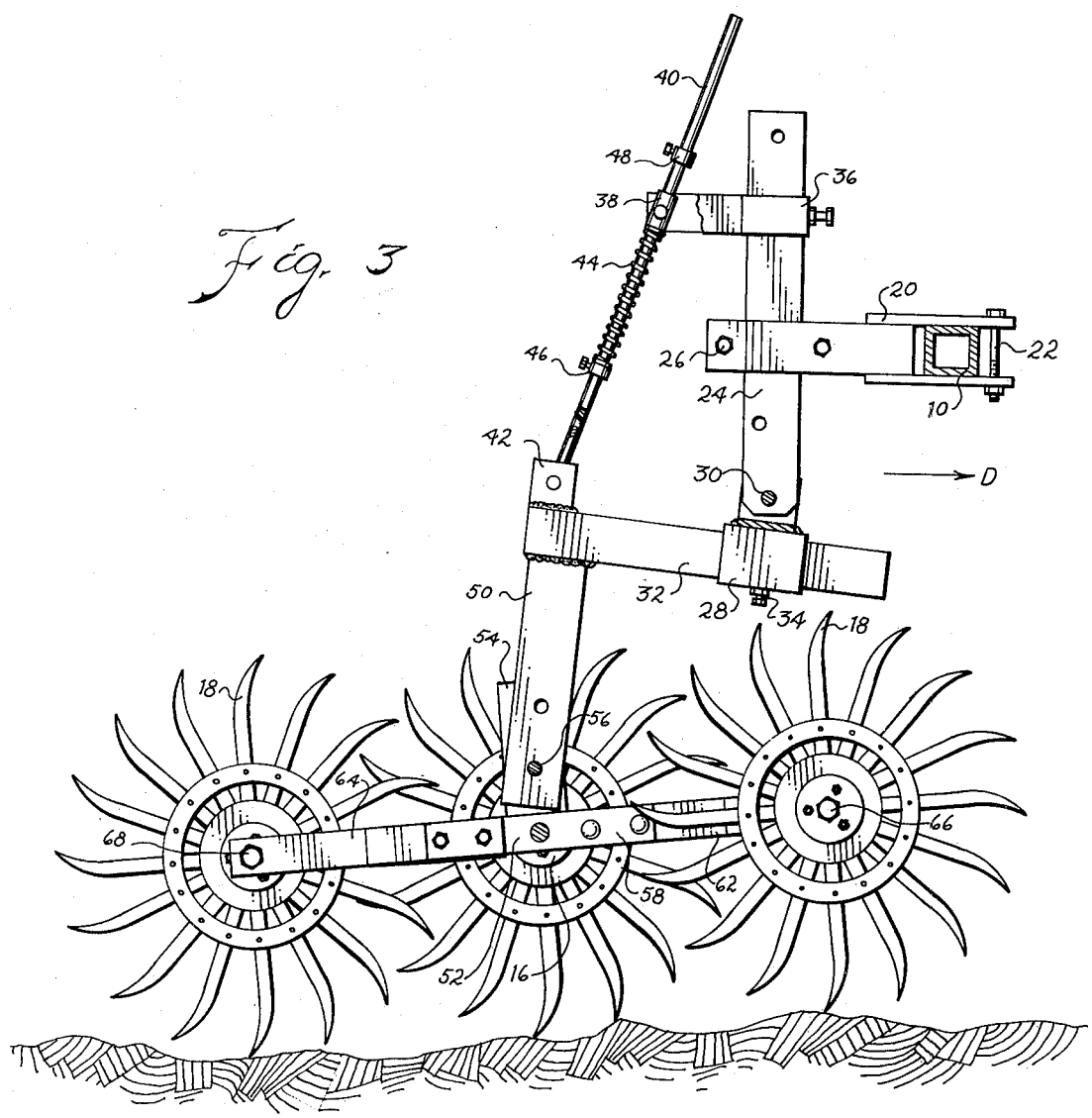
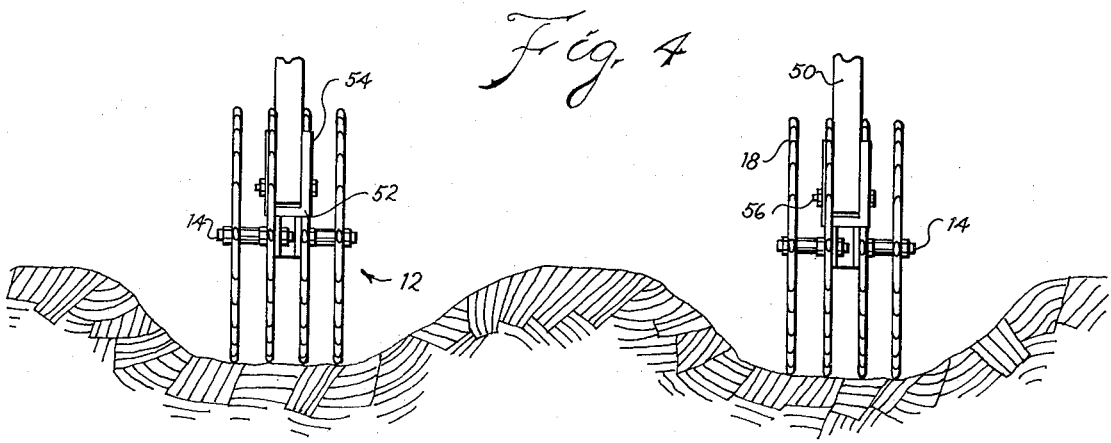

ROTARY HOE SCRATCHER

CROSS-REFERENCE TO RELATED APPLICATIONS

None. However, applicant filed Disclosure Document No. 067,854, Jan. 23, 1978, which document concerns this application; therefore, by separate letter, it is respectfully requested that the document be retained and acknowledgement thereof made by the Examiner.

BACKGROUND OF THE INVENTION (1) Field of the Invention

This invention relates to earth working equipment and more particularly to rotary hoes which are rotating tools with tines extending radially from a hub.

(2) Description of the Prior Art

Rotary hoes are old and well known agricultural implements which are commercially available on the market. They are often used to break the crust upon the soil which occurs after rain.

Quite often after a crop has been planted, a rain will occur. If the planted crop has not emerged and the crust formed is too tough for the crop to break through it is necessary to break the crust. Also, after the crop has emerged, it is often desirable to break the crust to kill small weeds which may have sprouted after the rain and also to cultivate the soil adjacent to the crop.

Trash and other debris tend to become speared upon the tines and cause the equipment to operate improperly.

The fields wherein this equipment is used is often irregular so there is a need to have the equipment float, i.e., follow the ground contour.

After a crop has emerged rotary hoes are often used to straddle the drill in connection with sweeps so as to prevent excessive dirt from being thrown by the sweep onto the growing crop. TIBBITTS, U.S. Pat. No. 1,880,584, shows such a use.

Before this application was filed, a search of the prior art in the United States Patent and Trademark Office was made. The following references, in addition to TIBBITTS, were discovered upon the search.

| Cone | 798,875 |
| Knutson | 1,490,514 |
| Neu | 1,639,307 |
| Johnson | 1,770,648 |
| Garber et al | 3,175,522 |
| Whitesides | 3,203,487 |
| McClenny | 3,398,707 |
| Brown et al | 4,055,126 |

It will be noted that WHITESIDES shows a complex mounting for a rotary hole gang assembly which includes spring biasing the gang downward and also includes a horizontal bar aligned with the direction of draft to which some of the rotary hoes are clamped.

SUMMARY OF THE INVENTION (1) New and Different Function

I have developed an improved mounting for the rotary hoe so that the tines are self cleaning. By having the tines very close to another rotating tine which rotates in an opposite direction, one hoe cleans the other. I.e., the relative movements with one set of tines moving upward and another set of tines moving downward will knock loose any sticks or other debris which may be speared upon one of the tines. In addition to this, according to my arrangement, the rotary hoes can be spaced very closely and compactly adjacent to one another so that the hoes tracks are only two inches (5 cm) apart. Therefore, the outside hoes are 6 inches (15 cm) apart. The hoes have a complete floating action to traverse uneven ground.

In addition, with my new design, the hoes can be used for scratching plants before emergence or also the assembly can be used as a rolling shield during cultivation.

Therefore, it may be seen that the total function of my invention far exceeds the sum of the functions of the individual springs, hoes, axles, bolts, etc.

(2) Objects of this Invention

An object of this invention is to till the soil. Another object of this invention is to provide a self cleaning rotary hoe assembly.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing.

BRIEF DESCRIPTION OF THE DRAWINGS

FIG. 3 is a sectional view taken substantially on line 3—3 of FIG. 2 with parts broken away for clarity, and the assembly is illustrated going over uneven ground.

FIG. 4 is a rear elevational view showing the rotary hoes in use with the furrowed ground shown schematically.

DESCRIPTION OF THE PREFERRED EMBODIMENTS

Figure 1:
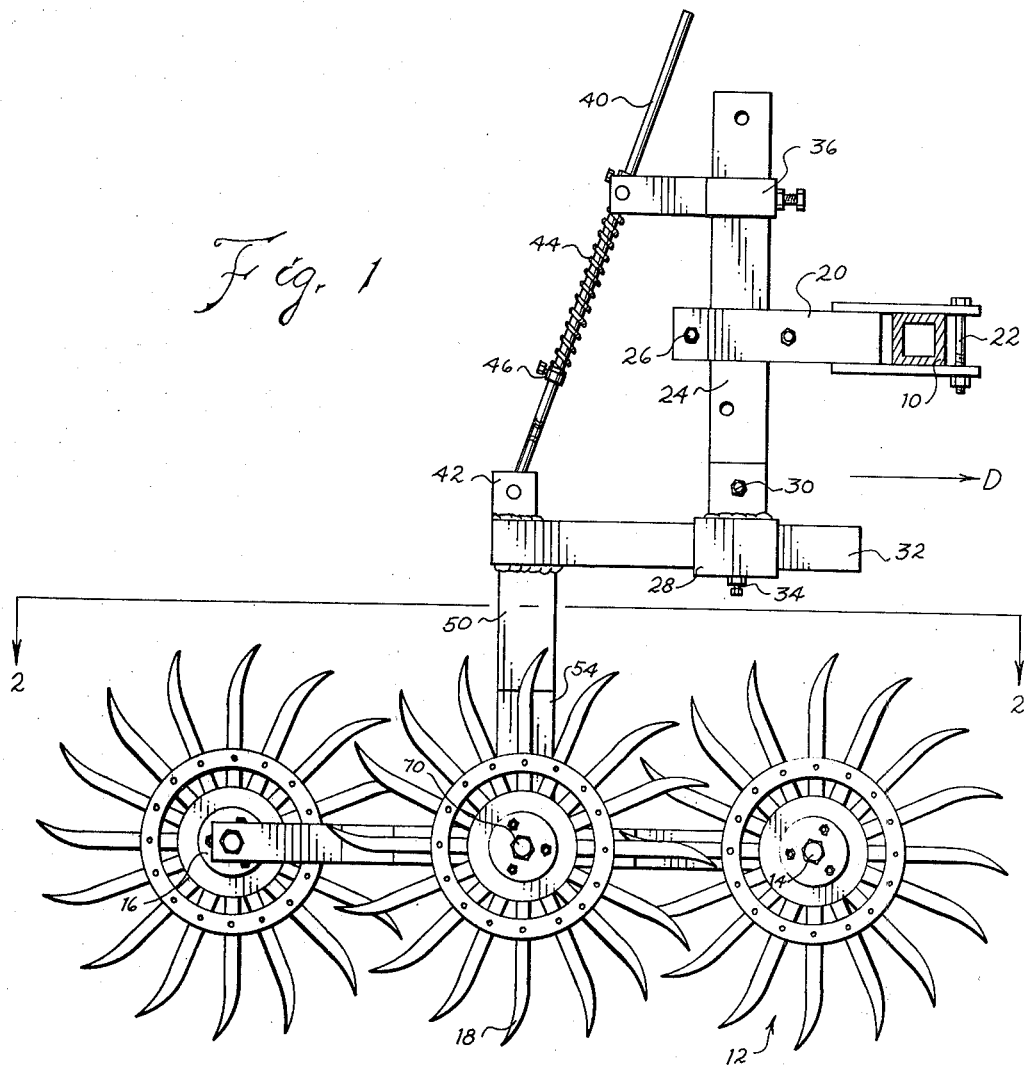
FIG. 1 is a side elevational view of the invention shown attached to a tool bar.
Figure 2:
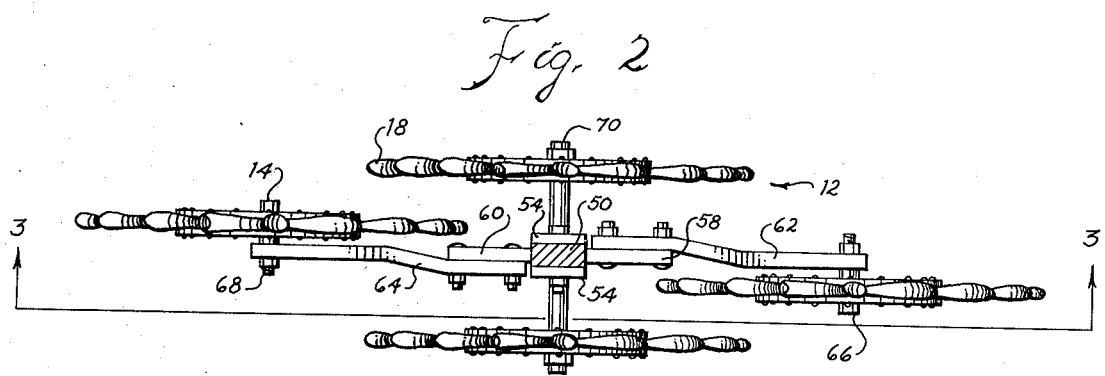
FIG. 2 is a top sectional view of the carriage taken substantially on line 2—2 of FIG. 1.

Referring to the drawing, it may be seen that the unit is adapted to be attached to tool bar 10. The tool bar is horizontal and is mounted on an agricultural draft vehicle in the form of a tractor. The direction of draft is indicated by Arrow D. A plurality of rotary hoes 12 is attached to the tool bar 10 by mechanism to be described later. It will be understood that each rotary hoe includes an axle 14. Hub 16 journalled to the axle. A plurality of tines 18 radiate from the hub in a plane to form the diameter of the rotary hoe. Those skilled in the agricultural art will understand rotary hoes, as described above, are old and well known in the art and commercially available.

Clamp 20 is attached to the tool bar 10 and horizontally adjustable along the length of the tool bar and is clamped securely in place by tool bar bolt 22. Bar shank 24 is clamped in a vertically adjustable position by shank bolts 26. I.e., the desired position of the bar shank is determined and then upon tightening the bolts 26, the shank 24 will be in the vertical position desired.

Sleeve 28 is pivoted to the bottom of the bar shank by sleeve pivot 30. The sleeve has two ears projecting up from it, one of which has been broken away in FIG. 3 for clarity, so that it may be seen that the sleeve 28 is free to rotate about an extremely large angle about the sleeve pin 30. The axis of the sleeve pin 30 is parallel to the horizontal tool bar 10. Horizontal bar 32 is telescoped within the sleeve 28. The horizontal bar 32 is aligned with the direction of draft D. The horizontal bar is set in place by set means in the form of set screw 34 extending through the sleeve 28 and bearing against the horizontal bar 32.

Spring bracket 36 telescopes over the top of the bar shank 24 and is held in position by a set screw extending through the bracket. The rear of the bracket 36 is bifurcated (a portion of which is broken away in FIG. 3) so that cross sleeve 38 may be mounted therein. Rod 40 telescopes through the cross sleeve 38 and has hook in the bottom portion which extends through ears 42 on the back of the horizontal bar 32. Helical compression spring 44 telescopes around the rod 40 and bears against the cross sleeve 38 and extends along to stop 46 which is between the end of the spring and the ears 42. Thus, it may be seen that the helical compression spring will bias the rear of the horizontal bar downward. The downward movement of the horizontal bar is limited by stop 48 attached to the rod 40 above the cross sleeve 38. Spring means, as described, are common to the agricultural arts.

Hoe shank 50 is rigidly attached, as by welding, to the back of the horizontal bar 32.

Central carriage 52 has two ears 54 which extend upward therefrom. Two bolt holes extend through the ears 54. A carriage pivot pin 56 extends through the lower of the two holes and also through a hole in the bottom of the hoe shank 50. Therefore, the central carriage 52 is pivoted to the bottom of the hoe shank. However, the swing of the carriage about the pin 56 is limited by the fact that the edges of the hoe shank 50 extend down so that they strike portions of the central carriage 52. FIG. 3 shows the maximum amount of rock or tilt or swing the central carriage can have relative to the hoe shank 50. At the maximum tilt the tines 18 will clear the front of the horizontal bar 32.

A second hole in the ears 54 is aligned with another hole in the hoe shank 50 and a bolt may be placed through these holes if it is desired to lock the central carriage in one position upon the hoe shank. When the unit is to be used as a rolling shield, it might be desired to lock the carriage to the shank as described.

The central carriage 52 includes forward stub arm 58 which extends forward of the central carriage. Rear stub arm 60 extends to the rear of the central carriage. Forward arm 62 is bolted to the stub arm 58. It will be noted that carriage bolts with round heads are used on the stub arm side so that there is no protrusion adjacent to the tines 18 of the forward most rotary hoe 12. Likewise, rear arm 64 is bolted to the rear stub arm 60 with carriage bolts as described.

Forward axle bolt 66 extends through the forward end of the forward arm 62. One of the axles 14 is on one end thereof and the other end is bolted to the forward arm. Thus it may be seen that the axle is cantilevered from the forward arm and supported only on one side of the forward arm. Also it will be noted that the forward arm 62 is bent so that the spacing between the rotary hoes is equal as described previously and particularly seen in FIG. 4. Likewise, rear axle bolt 68 extends through the end of the rear arm 64 (which is also bent) and one end of the rear axle bolt forms one of the axles 14 and the other end is bolted to the rear arm 64.

Central axle bolt 70 has one of the axles 14 on each end thereof and it extends through the central carriage 52 in line and halfway between the forward axle bolt 66 and rear axle bolt 68. It may be seen also that the rotary hoes, which are mounted on the central axle bolt, are cantilevered out from the central carriage and supported on only one side.

It may be seen that the distance of the front axle bolt 66 to the central axle bolt 70 is the same as the distance from the rear axle bolt 68 to the central axle bolt 70 and that each of these distances is less than the diameter of each of the rotary hoes 12; all of the rotary hoes 12 having the same diameter. Also, it may be seen from the drawings that the plane of the tines of each of the four hoes is spaced an equal amount from the plane of the next nearest hoe. Therefore, it may be seen that I have achieved the desired results identified above of having the tines of the rotary hoe overlapping so that they can be self cleaning yet have a minimum of any other obstructions such as framework, or the like to form an obstruction of trash which might accumulate on the tines of the rotary hoes.

With the forward and rear arms 62 and 64 removed, the two hoes on the central axle bolts may be used as shields for sweeps attached to the tool bar 10. The horizontal bar 32 may be moved until the hoes are properly related to the sweeps.

As an aid to correlating the terms of the claims to the exemplary drawing, the following catalog of elements is provided:

| | |
|---|---|
| 10 tool bar | 42 ears |
| 12 rotary hoes | 44 spring |
| 14 axle | 46 stop |
| 16 hub | 48 stop |
| 18 tines | 50 hoe shank |
| 20 clamp | 52 central carriage |
| 22 tool bar bolt | 54 ears |
| 24 bar shank | 56 carriage pivot pin |
| 26 shank bolts | 58 forward stub arm |
| 28 sleeve | 60 rear stub arm |
| 30 sleeve pin | 62 forward arm |
| 32 horizontal bar | 64 rear arm |
| 34 set screw | 66 forward axle bolt |
| 36 spring bracket | 68 rear axle bolt |
| 38 cross sleeve | 70 central axle bolt |
| 40 rod | |

The axles 14 are desirably close together. The front and rear hoe could be closer to the central axle bolt 70 than is shown in the drawing. There must be clearance between the tips of the tines 16 and the axle bolt 70.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. On an agricultural draft vehicle having
   a. a direction of draft,
   b. a horizontal tool bar normal to the direction of draft, and
   c. a plurality of rotary hoes, each including
      (i) an axle,
      (ii) a hub journalled to the axle, and (iii) a plurality of tines in a plane radiating from the hub forming a diameter;

the improved structure for mounting the rotary hoes to the tool bar comprising:
- d. a central carriage,
- e. a central axle bolt having one of said axles on each end thereof extending through the carriage,
- f. a pair of ears extending upward from the carriage straddling
- g. a hoe shank connected to said tool bar,
- h. at least one shank bolt connecting the ears to the shank,
- j. a forward stub arm extending forward from the central carriage,
- k. a rear stub arm extending rearwardly from the central carriage,
- m. a forward arm bolted to the forward stub arm,
- n. a forward axle bolt with
    - (i) one of said axles on one end thereof, and
    - (ii) the other end bolted to said forward arm,
- o. a rear arm bolted to the rear stub arm,
- p. a rear axle bolt with
    - (i) one of said axles on one end thereof, and
    - (ii) the other end bolted to said rear arm,
- q. so that
    - (i) the distance of the front axle bolt to the central axle bolt is the same as the distance of the rear axle bolt to the central axle bolt,
    - (ii) which distance is less than the diameter of the rotary hoes, and
    - (iii) the plane of the tines of each of the four hoes is spaced an equal amount from the plane of the next nearest hoe.

2. The invention as defined in claim 1 further comprising:
- r. a clamp attached adjustably along the length of the tool bar,
- s. a bar shank in the clamp at a vertically adjustable position,
- t. a sleeve pivoted to the bottom of the bar shank,
- u. a horizontal bar aligned with the direction of draft telescoped in the sleeve,
- v. set means on the sleeve for setting the horizontal bar in a preset position,
- w. spring means connected from the back of the horizontal bar to near the top of the bar shank for biasing the horizontal bar, and
- x. said hoe shank rigidly fixed to the back of the horizontal bar.

3. On an agricultural draft vehicle having
- a. a direction of draft,
- b. a horizontal tool bar normal to the direction of draft, and
- c. a plurality of rotary hoes, each including
    - (i) an axle,
    - (ii) a hub journalled to the axle, and
    - (iii) a plurality of tines in a plane radiating from the hub forming a diameter;

the improved structure for mounting the rotary hoes to the tool bar comprising:
- d. a clamp attached horizontally adjustably along the length of the tool bar,
- e. a bar shank in the clamp at a vertically adjustable position,
- f. a sleeve pivoted to the bottom of the bar shank,
- g. a horizontal bar aligned with the direction of draft telescoped in the sleeve,
- h. set means on the sleeve for setting the horizontal bar in a preset position,
- j. spring means connected from the back of the horizontal bar to near the top of the bar shank for biasing the horizontal bar, and
- k. a hoe shank rigidly fixed to the back of the hoizontal bar, and
- m. a central carriage attached to the bottom of the hoe shank, said rotary hoes attached to the central carriage.

* * * * *